May 7, 1929.                J. L. WESTHAVER                1,711,709
                              CARBON HOLDER
                   Filed Oct. 29, 1927        2 Sheets-Sheet 1
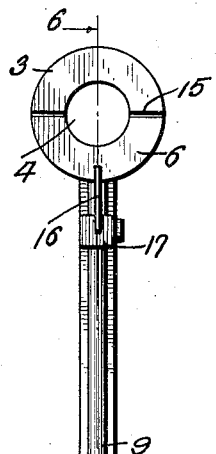
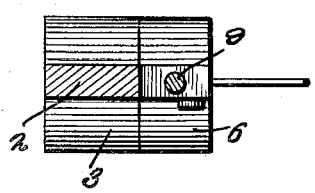
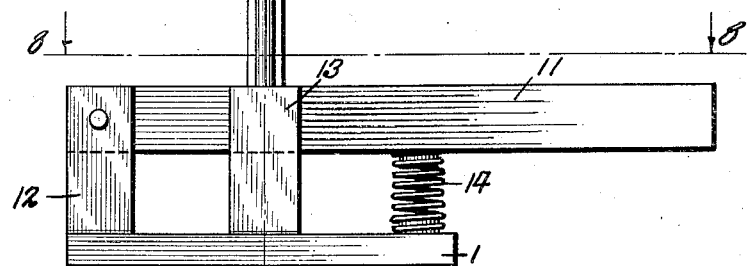
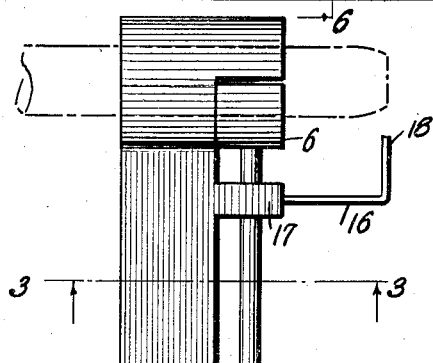
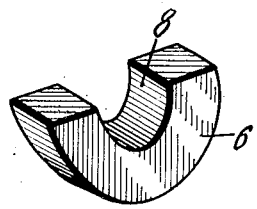
Witnesses
INVENTOR.
John L. Westhaver
BY
ATTORNEYS.

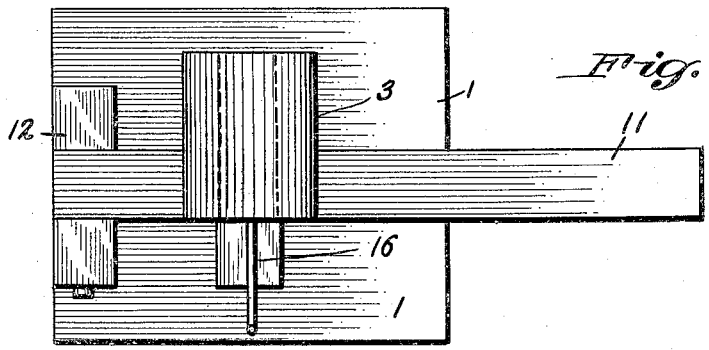
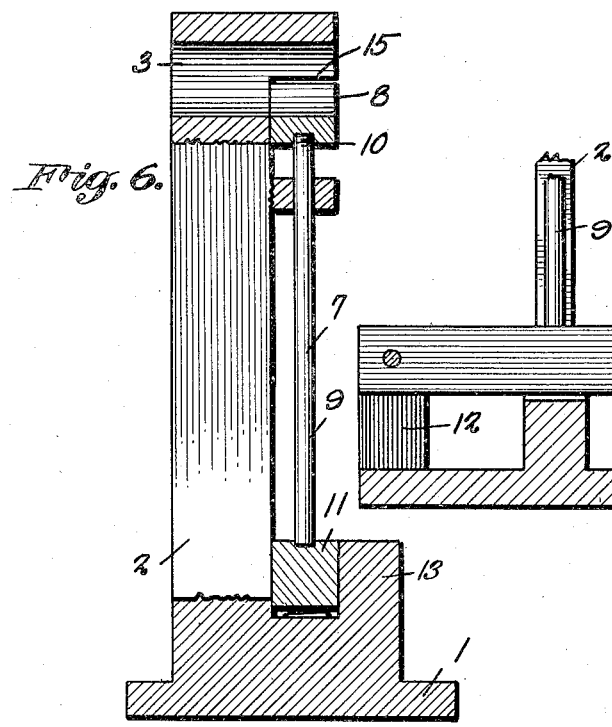
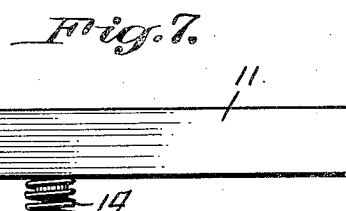
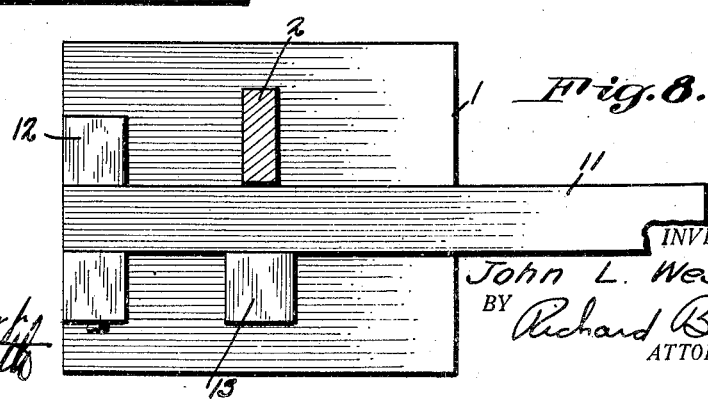

Patented May 7, 1929.

1,711,709

UNITED STATES PATENT OFFICE.

JOHN L. WESTHAVER, OF SAN DIEGO, CALIFORNIA.

CARBON HOLDER.

Application filed October 29, 1927. Serial No. 229,776.

This invention relates to a carbon holder and has for its primary object the construction wherein the component parts cooperate in a manner to more effectively secure the carbon in place but at the same time accommodate the ready projection thereof.

Another object of the invention is the provision of a carbon holder with a novel form of clamp capable of effectively clamping the carbon in place but may be very readily manipulated about the carbon for adjustment or complete removal.

Another object of the invention is the novel manner of constructing the socket and clamp so that they may coact in a manner to more effectively clamp the carbon in position.

Besides the above my invention is distinguished in the novel construction of clamp device whereby the clamp may be adjusted from a remote part readily accessible.

A feature of the invention is the construction of the socket with its cut out portion in which is snugly fitted a clamp element which when in clamping position has its inner curved surface flush with the curved surface of the bore of the socket so as to insure the proper clamping engagement with the carbon.

With these and other objects in view, the invention will be better understood from the following description taken in connection with the accompanying drawings, wherein:—

Figure 1 is a side elevation of the holder,
Figure 2 is an end elevation,
Figure 3 is a sectional view on the line 3—3 of Figure 1,
Figure 4 is a perspective view of the clamp element,
Figure 5 is a top plan view,
Figure 6 is a sectional view on the line 6—6 of Figure 2,
Figure 7 is a sectional view on the line 7—7 of Figure 1,
Figure 8 is a sectional view on the line 8—8 of Figure 2.

Again referring to the drawings illustrating one of the many constructions of my invention, the numeral 1 designates a base supporting the upright 2 having at its upper end my improved structure for clamping the carbon hereinafter known as the socket 3. This socket 3 is of barrel shaped formation to provide the cylindrical bore 4. This socket is provided with a cut out portion snugly receiving the clamp element 6 forming a part of my novel construction of clamp device designated in its entirety by the numeral 7. It will be noted that the inner curved surface 8 of this clamp element is of the same curvature as the wall of the bore 4 so that the same may conform to the curvature of the bore in the clamping of the carbon for effective tight engagement between the surface of the carbon and the walls of the bore and the clamp element.

My novel device also includes a rod 9 having a screw threaded engagement with the clamp element as illustrated at 10 and fixed to the manipulating lever 11 that is pivotally connected to the ears 12 extending from the base 1. The lever 11 is guided in its movement by the opposed relations of the upright 2 and the side rib 13 carried by the base. The lever 11 is provided for the purpose of giving reciprocatory movement to the rod 9 for moving the clamp element 8 into and out of clamping engagement and, for the purpose of holding the clamping element normally in clamping position with a yieldable engagement with the carbon I arrange an expansion spring 14 between the base 1 and the under surface of the lever 11 and which constantly acts to swing the lever upwardly thereby moving the rod 9 upwardly and the clamp element 8 into clamping position with the carbon or with the opposing shoulders 15 formed by the cutout portion of the socket.

To complete the invention I have illustrated a gage 16 projecting from one of the bearings 17 of the rod 9 so as to have its indicating point 18 disposed contiguous to the carbon as clearly shown in Figure 1 of the drawings.

In the use of my improved carbon holder for supporting carbons and more particularly for supporting the carbon used in a motion picture projection machine the carbon may be quickly and effectively supported within the socket and clamped in such position by the clamping engagement of the clamp element 8 which action is facilitated by the expansion of the spring 14 which constantly acts upon lever 11 to force the same vertically thereby move the clamp element 8 into engagement with the carbon by means of the rod 9.

In the removal of the carbon from the holder it will be only necessary to slightly depress the lever 11 for sliding the clamp element out of engagement with the carbon. This acts to release the carbon from the clamp element so that the carbon can be readily slid out of engagement with the socket.

From the foregoing description taken in connection with the accompanying drawings it will be appreciated that I provide a device, of substantial construction consisting of a relatively few parts so designed and associated that they may be very readily manipulated for effectively clamping a carbon in position.

It is of course to be understood that the component parts may be designed in various other manners than illustrated and associated in other relation and therefore I do not desire to be limited in any manner except as set forth in the following claim.

What I claim is:

A carbon holder comprising a base, an upright secured to the base, a cylindrical socket secured to the upright and provided with a cut out portion, a clamp mounted in the cut out portion for clamping engagement with the carbon, a rod secured to the clamp and slidably supported on the upright, a lever pivotally connected to the base and having an operative engagement with the rod, and a spring acting against the lever to hold said clamp in clamping position.

In testimony whereof I affix my signature.

JOHN L. WESTHAVER.